United States Patent
Tsai et al.

(10) Patent No.: US 8,772,412 B2
(45) Date of Patent: Jul. 8, 2014

(54) META-STABLE STATE NITROGEN-CONTAINING POLYMER

(75) Inventors: Li-Duan Tsai, Hsinchu (TW);
Yueh-Wei Lin, Hsinchu (TW);
Chia-Chen Fang, Taipei (TW);
Cheng-Liang Cheng, Hsinchu (TW);
Jing-Pin Pan, Hsinchu County (TW);
Tsung-Hsiung Wang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 145 days.

(21) Appl. No.: 13/339,386

(22) Filed: Dec. 29, 2011

(65) Prior Publication Data

US 2012/0172558 A1 Jul. 5, 2012

Related U.S. Application Data

(63) Continuation-in-part of application No. 13/109,008, filed on May 17, 2011, now abandoned.

(30) Foreign Application Priority Data

Dec. 29, 2010 (TW) .............................. 99146605 A
Dec. 21, 2011 (TW) .............................. 100147749 A

(51) Int. Cl.
*C08F 26/06* (2006.01)
*C08F 226/06* (2006.01)
*C08F 126/06* (2006.01)
*C08G 73/06* (2006.01)

(52) U.S. Cl.
USPC .................. 525/326.7; 525/327.1; 525/328.2; 525/328.4; 525/329.4; 525/540; 528/423

(58) Field of Classification Search
USPC .......... 525/326.7, 327.1, 328.2, 328.4, 329.4, 525/540; 528/423
See application file for complete search history.

(56) References Cited

U.S. PATENT DOCUMENTS

| | | | |
|---|---|---|---|
| 6,033,797 A | 3/2000 | Mao et al. | |
| 6,045,952 A | 4/2000 | Kerr et al. | |
| 6,074,776 A | 6/2000 | Mao et al. | |
| 6,074,777 A | 6/2000 | Reimers et al. | |

(Continued)

FOREIGN PATENT DOCUMENTS

| | | |
|---|---|---|
| EP | 0775701 | 5/1997 |
| JP | 63-139915 | 6/1988 |

(Continued)

OTHER PUBLICATIONS

Jiang et al., "The studies on copolymer of 2, 4, 6—tris ( 2-allylphenoxry )—1, 3, 5—triazine (TAPT), 4, 4—bismaleimido—diphenylmethane (BMDPM)," China Academic Journal Electronic Publishing House, Feb. 20, 2005, pp. 1-4.

(Continued)

*Primary Examiner* — Duc Truong
(74) *Attorney, Agent, or Firm* — Jianq Chyun IP Office

(57) ABSTRACT

A meta-stable state nitrogen-containing polymer formed by reacting Compound (A) and Compound (B) is described. Compound (A) is a monomer having a reactive terminal functional group. Compound (B) is a heterocyclic amino aromatic derivative as an initiator. The molar ratio of Compound (A) to Compound (B) is from 10:1 to 1:10. The meta-stable state nitrogen-containing polymer has a variance less than 2% in its narrow molecular weight distribution after being retained at 55° C. for one month.

10 Claims, 13 Drawing Sheets

(56) References Cited

U.S. PATENT DOCUMENTS

| | | | |
|---|---|---|---|
| 6,146,790 | A | 11/2000 | Omaru et al. |
| 6,387,571 | B1 | 5/2002 | Lain et al. |
| 6,413,679 | B1 | 7/2002 | Kuboki et al. |
| 7,217,479 | B2 | 5/2007 | Park et al. |
| 7,300,852 | B2 | 11/2007 | Cho et al. |
| 7,736,812 | B2 | 6/2010 | Han et al. |
| 7,745,054 | B2 | 6/2010 | Kim et al. |
| 2002/0001756 | A1 | 1/2002 | Hamamoto et al. |
| 2006/0194118 | A1 | 8/2006 | Yew et al. |
| 2009/0253045 | A1 | 10/2009 | Kotato et al. |

FOREIGN PATENT DOCUMENTS

| | | |
|---|---|---|
| JP | 4185119 | 7/1992 |
| JP | 09106835 | 4/1997 |
| JP | 11012623 | 1/1999 |
| JP | 2001332297 | 11/2001 |
| JP | 2005209469 | 8/2005 |
| JP | 2008198542 | 8/2008 |
| TW | 480756 | 3/2002 |
| TW | 506156 | 10/2002 |
| TW | 523946 | 3/2003 |
| TW | I232607 | 5/2005 |
| TW | I323522 | 4/2010 |

OTHER PUBLICATIONS

"Office Action of Japan Counterpart Application", issued on Dec. 18, 2012, p. 1-p. 3, in which the listed reference (JP Foreign Patent Documents) was cited.

"First Office Action of China Counterpart Application", issued on May 6, 2013, p. 1-p. 5, in which the listed reference (Non-Patent Literature Document) was cited.

US 8,772,412 B2

META-STABLE STATE NITROGEN-CONTAINING POLYMER

CROSS-REFERENCE TO RELATED APPLICATION

This application is a continuation-in-part of a prior U.S. application Ser. No. 13/109,008, filed on May 17, 2011, now abandoned, which claims the priority benefit of Taiwan application serial no. 99146605, filed on Dec. 29, 2010. This application also claims the priority benefit of Taiwan application serial no. 100147749, filed on Dec. 21, 2011. The entirety of each of the above-mentioned patent applications is hereby incorporated by reference herein and made a part of this specification.

BACKGROUND

1. Technical Field

This application relates to a polymer, and more generally to a meta-stable state nitrogen-containing polymer.

2. Description of Related Art

Polymeric materials are inseparable from human daily life. For example, blend fabric clothes, plastic bags, automobile tires and bumpers, precise electric materials or even artificial bones are associated with polymeric materials. A polymer is usually formed from monomers through a polymerization reaction. Due to the time-consuming polymerization process, "two-liquid type" polymer and "one-liquid type" polymer are developed to shorten the synthesis time and broaden the application.

The "two-liquid type" polymer includes a main agent and an auxiliary agent. These two agents are mixed before using. For example, the epoxy resin adhesive of two-liquid type includes a resin as a main agent and a hardener as an auxiliary agent. Due to separate preservation of the agents, the "two-liquid type" polymer can be preserved for a long period of time, without interaction between the agents that causes the polymer degradation. Further, the mixture of the agents usually has better quality (such as heat resistance) as compared with the "one-liquid type" polymer. However, an additional mixing step before using is required.

The "one-liquid type" polymer is formed by mixing all required materials. For example, the epoxy resin adhesive of one-liquid type includes a resin, a solvent, a hardener and an inhibitor, etc. The "one-liquid type" polymer can be used right after unsealing. However, the preservation is difficult. Usually, it is required to be preserved under low temperature (e.g. below room temperature) to avoid the polymer degradation.

Both "two-liquid type" polymer and "one-liquid type" polymer have the problem in which the viscosity of the polymer is increased as it is exposed to air too long after unsealing. As a result, the polymer is hardened and can not be used anymore. Therefore, a material with the above advantages but without the above drawbacks is deeply desired so as to broaden the application.

SUMMARY

Accordingly, the disclosure provides a meta-stable state nitrogen-containing polymer, in which a mixing step is omitted, long preservation is possible at room temperature (or above room temperature), and abrupt change in viscosity after unsealing is avoided.

A meta-stable state nitrogen-containing polymer is introduced herein. The meta-stable state nitrogen-containing polymer formed by reacting Compound (A) and Compound (B). Compound (A) is a monomer with a reactive terminal functional group. Compound (B) is a heterocyclic amino aromatic derivative as an initiator. A molar ratio of Compound (A) to Compound (B) is from 10:1 to 1:10.

Based on the above, the meta-stable state nitrogen-containing polymer of the disclosure can be stored at low or middle temperature for a long period of time, while maintaining its stable properties such as viscosity and particle size distribution. Furthermore, the meta-stable state nitrogen-containing polymer has part of the reactive functional groups remained, and the remaining reactive function groups can be re-induced to react by applying an appropriate temperature or voltage; and thus, the purpose of the application can be easily achieved.

In order to make the features and advantages of the application clearer and more understandable, the following embodiments are illustrated in detail with reference to the appended drawings.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
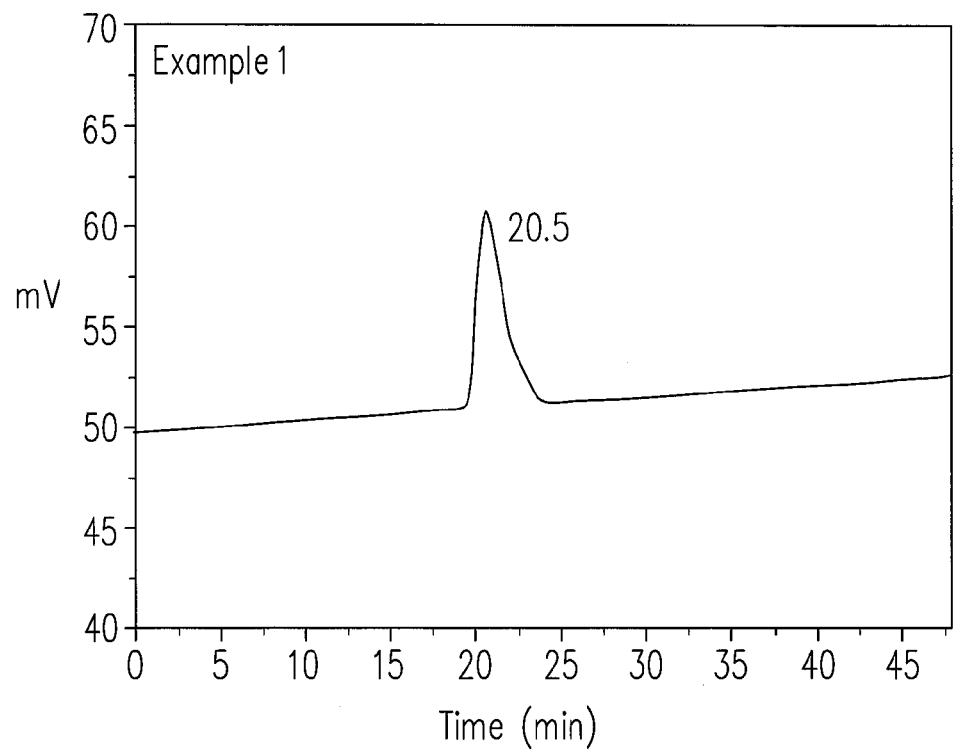
FIGS. 1-21 are GPC diagrams of meta-stable state nitrogen-containing polymers of Examples 1-21 according to the disclosure.

A meta-stable state nitrogen-containing polymer of the disclosure is formed by reacting Compound (A) and Compound (B). Compound (A) is a monomer with a reactive terminal functional group. Compound (B) is a heterocyclic amino aromatic derivative as an initiator. A molar ratio of Compound (A) to Compound (B) is from 10:1 to 1:10.

Compound (B) is represented by one of Formula (1) to Formula (9):

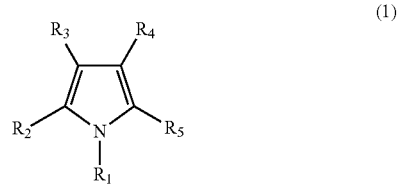

(1)

-continued

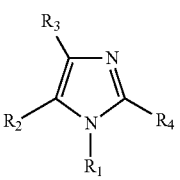
(2)

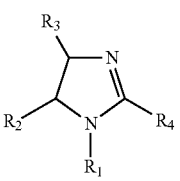
(3)

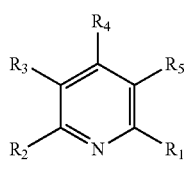
(4)

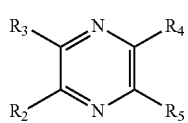
(5)

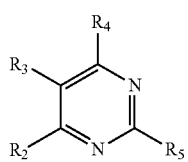
(6)

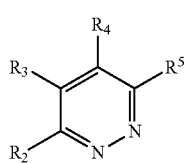
(7)

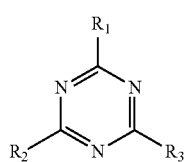
(8)

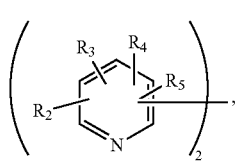
(9)

wherein $R_1$ is hydrogen, alkyl, alkenyl, phenyl, dimethylamino, or —$NH_2$; and $R_2$, $R_3$, $R_4$ and $R_5$ are each independently hydrogen, alkyl, alkenyl, halo, or —$NH_2$.

In an embodiment, examples of Compound (B) are as shown in Table 1.

TABLE 1

| Chemical Name | Structural Formula |
|---|---|
| Imidazole | |
| Pyrrole | |
| Pyridine | |
| 4-tert-butylpyridine | |
| 3-butylpyridine | |
| 4-dimethylaminopyridine | |
| 2,4,6-triamino-1,3,5,-triazine (melamine) | |
| 2,4-dimethyl-2-imidazoline | |
| Pyridazine | |
| Pyrimidine | |

TABLE 1-continued

| Chemical Name | Structural Formula |
| --- | --- |
| Pyradine | 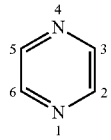 |

It is appreciated by persons skilled in the art that the derivative of each compound in Table 1 or any combination of the compounds in Table 1 can serve as Compound (B) for synthesizing the meta-stable state nitrogen-containing polymer of the disclosure. For example, Compound (B) may also be an imidazole derivative or a pyrrole derivative.

In an embodiment, Compound (A) is a maleimide monomer, represented by one of Formula (10) to Formula (13):

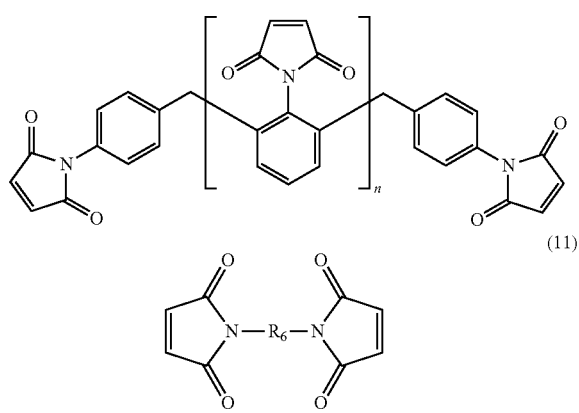

(10)

(11)

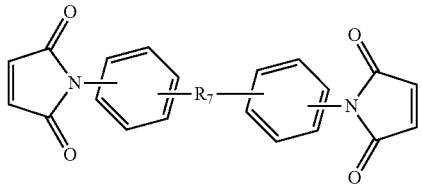

(12)

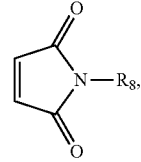

(13)

wherein n is an integer of 0 to 4; $R_6$ is —$RCH_2R'$—, —RNHR—, —$C(O)CH_2$—, —R'OR"OR'—, —$CH_2OCH_2$—, —C(O)—, —O—, —O—O—, —S—, —S—S—, —S(O)—, —$CH_2S(O)CH_2$—, —(O)S(O)—, —$C_6H_4$—, —$CH_2(C_6H_4)CH_2$—, —$CH_2(C_6H_4)(O)$—, —$CH_2$—($NC_2H_4$)—$C_2H_4$—, siloxane, biphenylenyl, substituted phenylene or substituted biphenylenyl, R is $C_{1-4}$ alkylene, R' is $C_{1-4}$ alkylene, biphenylenyl, substituted phenylene or substituted biphenylenyl, R" is $C_{1-4}$ alkylene, substituted phenylene or —$C_6H_4$—$C(CF_3)_2$—$C_6H_4$—, biphenylenyl or substituted biphenylenyl; $R_7$ is $RiCH_2$—, —$CH_2$—(O)—, —$C(CH_3)_2$—, —O—, —O—O—, —S—, —S—S—, —(O)S(O)—, —$C(CF_3)_2$— or —S(O)—, Ri is $C_{1-4}$ alkylene; and $R_8$ is hydrogen, $C_{1-4}$ alkyl, phenyl, benzyl, cyclohexyl, —$SO_3H$, —$C_6H_4CN$, N-methoxy carbonyl, —$(C_6H_4)$—O$(C_2H_4O)$—$CH_3$, $C_2H_4$—$(C_2H_4O)_{11}$—$OCH_3$ or —$C(O)CH_3$.

Examples of the maleimide monomer are as shown in Table 2.

TABLE 2

| Chemical Name | Structural Formula |
| --- | --- |
| 4,4'-diphenylmethane bismaleimide | 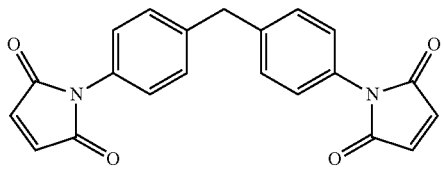 [SMILES: O=C1C=CC(=O)N1c1ccc(Cc2ccc(N3C(=O)C=CC3=O)cc2)cc1]<br>CAS NO: 13676-54-5 |
| oligomer of phenylmethane maleimide | 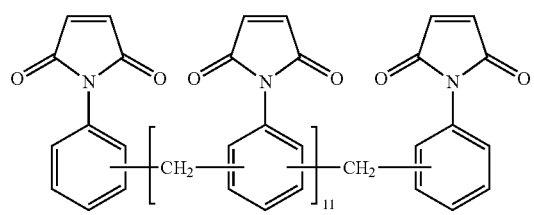<br>CAS NO: 67784-74-1 |

TABLE 2-continued

| Chemical Name | Structural Formula |
|---|---|
| m-phenylene bismaleimide | 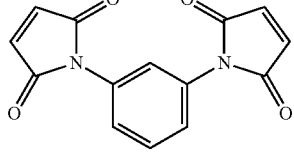<br>CAS NO: 3006-93-7 |
| 2,2'-bis[4-(4-maleimidophenoxy)phenyl] propane | 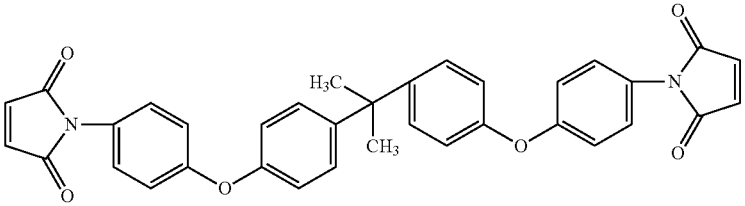 [SMILES: CC(C)(c1ccc(Oc2ccc(N3C(=O)C=CC3=O)cc2)cc1)c1ccc(Oc2ccc(N3C(=O)C=CC3=O)cc2)cc1]<br>CAS NO: 79922-55-7 |
| 3,3'-dimethyl-5,5'-diethyl-4,4'-diphenyl methane bismaleimide | 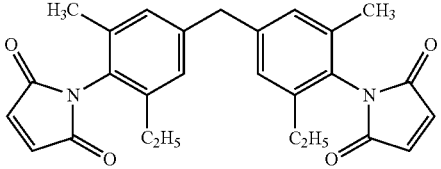 [SMILES: CCc1cc(Cc2cc(C)c(N3C(=O)C=CC3=O)c(CC)c2)cc(C)c1N1C(=O)C=CC1=O]<br>CAS NO: 105391-33-1 |
| 4-methyl-1,3-phenylene bismaleimide | 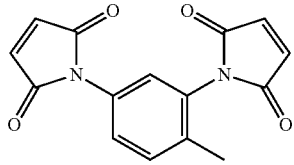 [SMILES: Cc1ccc(N2C(=O)C=CC2=O)cc1N1C(=O)C=CC1=O]<br>CAS NO: 6422-83-9 |
| 1,6'-bismaleimide-(2,2,4-trimethyl)hexane | 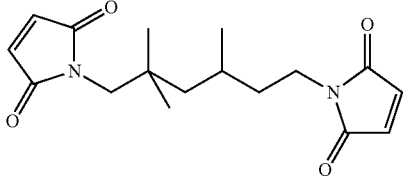 [SMILES: CC(CCN1C(=O)C=CC1=O)CC(C)(C)CN1C(=O)C=CC1=O]<br>CAS NO: 39979-46-9 |
| 4,4'-diphenylether bismaleimide | 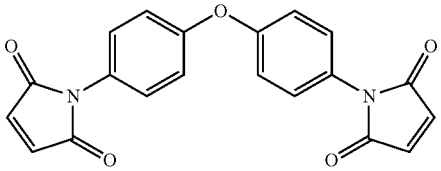 [SMILES: O=C1C=CC(=O)N1c1ccc(Oc2ccc(N3C(=O)C=CC3=O)cc2)cc1]<br>CAS NO: 77529-41-0 |
| 4,4'-diphenylsulfone bismaleimide | 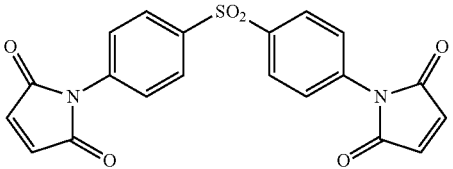<br>CAS NO: 13102-25-5 |

TABLE 2-continued
| Chemical Name | Structural Formula |
|---|---|
| 1,3-bis(3-maleimidophenoxy)benzene | 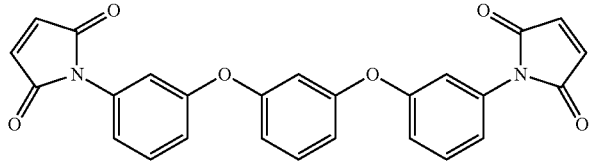 [SMILES: O=C1C=CC(=O)N1c1cccc(Oc2cccc(Oc3cccc(N4C(=O)C=CC4=O)c3)c2)c1] CAS NO: 54909-96-5 |
| 1,3-bis(4-maleimidophenoxy)benzene | 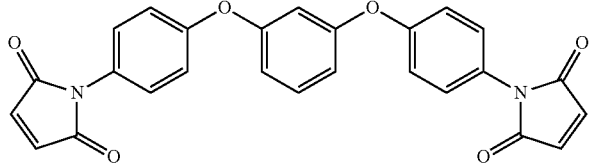 [SMILES: O=C1C=CC(=O)N1c1ccc(Oc2cccc(Oc3ccc(N4C(=O)C=CC4=O)cc3)c2)cc1] CAS NO: 115341-26-9 |
| 2,2-bis(4-(p-maleimidophenoxy)-phenyl)-Hexafluoropropane | 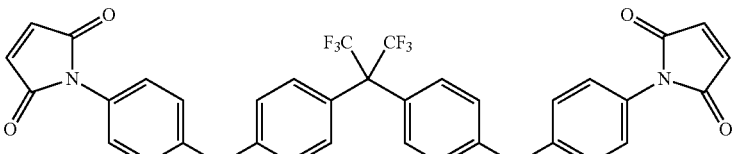 |
| 2,2-bis(p-maleimidophenyl)-hexafluoropropane | 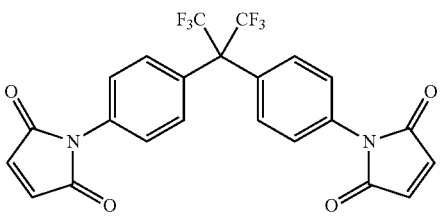 [SMILES: O=C1C=CC(=O)N1c1ccc(C(c2ccc(N3C(=O)C=CC3=O)cc2)(C(F)(F)F)C(F)(F)F)cc1] |
| 1,8-bis-maleimidodiethylene glycol | 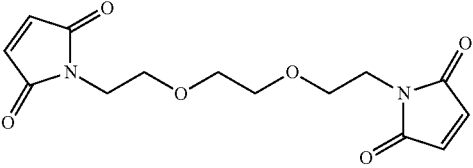 [SMILES: O=C1C=CC(=O)N1CCOCCOCCN1C(=O)C=CC1=O] |
| tris(2-maleimidoethyl)amine | 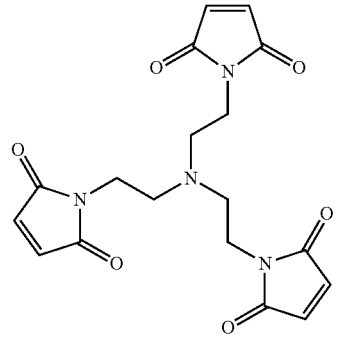 [SMILES: O=C1C=CC(=O)N1CCN(CCN1C(=O)C=CC1=O)CCN1C(=O)C=CC1=O] |
| poly(ethylene glycol(11)) 4-maleimidophenyl methyl diether terminated | 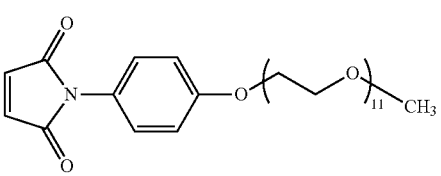 |

TABLE 2-continued

| Chemical Name | Structural Formula |
|---|---|
| 4-maleimidophenol | |
| 4-maleimido-benzenesufonic acid | |
| poly(ethylene glycol(11)) 2-maleimido-ethyl methyl diether terminated | |
| 2-maleimido propylene glycol 1-(2-methoxyethyl) ether | |
| ethylene glycol 2-maleimidopropyl methyl diether | |
| poly(dimethsiloxane) bis(3-maleimido-propyl-dimethylsilyl) terminated | |

In another embodiment, Compound (A) may also be poly(ethylene glycol)dimethacrylate, bis[[4-[(vinyloxy)methyl]cyclohexyl]methyl]isophthalate, or triallyl trimellitate.

Next, a synthesis method of the meta-stable state nitrogen-containing polymer of the disclosure is described. Firstly, Compound (A) is dissolved in a solvent, to form a mixture solution. Then, Compound (B) is added into the mixture solution in batches, and thermally polymerized by heating. The molar ratio of Compound (A) to Compound (B) is, for example, from 10:1 to 1:10, or from 1:1 to 5:1.

The solvent includes γ-butyrolactone (GBL), ethylene carbonate (EC), propylene carbonate (PC), N-methyl pyrrollidone (NMP), or a suitable high-polarity solvent, and is capable of providing high dissolution ability, which is beneficial to the thermal polymerization of the reactants. Moreover, the application scope of the mixture solution is widened by the flexible variation of the solid content.

Compound (B) may be added in 2-30 equivalent batches or non-equivalent batches, and preferably in 4-16 batches; an adding time interval may be 5 minutes to 6 hours, and preferably 15 minutes to 2 hours; and the reaction may be performed at a temperature of 60-150° C., and preferably 120-140° C. Furthermore, reaction time refers to a time that the reaction lasts after Compound (B) is completely added, and may be 0.5 hour to 48 hours, and preferably 1 hour to 24 hours.

That is to say, Compound (B) is gradually added, in batches at a time interval (multiple times, e.g. twice or more times), into the mixture solution of Compound (A)/solvent system at the reaction temperature for thermal polymerization, so that gelation or a network structure generated by over reaction caused by adding of Compound (B) completely at one time can be avoided.

The meta-stable state nitrogen-containing polymer synthesized in the disclosure can be stored at room temperature (or higher) for a long time, and the viscosity thereof will not change drastically after unsealing. Furthermore, the meta-stable state nitrogen-containing polymer of the disclosure has part of the reactive functional groups remained, thus being beneficial to the subsequent processing, and optionally, the remaining reactive functional groups may be facilitated to react by heating or applying a voltage. In an embodiment, the meta-stable state nitrogen-containing polymer is re-induced to react at a temperature of 120-220° C., to convert the meta-stable state nitrogen-containing polymer into a macromolecular polymer completely. In an embodiment, the meta-stable state nitrogen-containing polymer is a narrow polydispersity polymer having a polydispersity index (PDI) of 0.9-1.7 and a GPC peak time of 19-24 minutes. In an embodiment, polydispersity index (PDI) is defined as weight average molecular weight divided by number average molecular weight (Mw/Mn).

Hereinafter, multiple synthesis examples are illustrated to verify the efficacy of the disclosure. FIGS. 1-21 are gel permeation chromatograms (GPCs) of meta-stable state nitrogen-containing polymers of Examples 1-21 according to the disclosure, in which the longitudinal axis is in millvolt (mV), and refers to signal strength (or sensitivity) of a detector, and the horizontal axis is in time.

Example 1

Firstly, oligomer of phenylmethane maleimide (Compound (A)) was dissolved in EC/PC in an amount of 3%, to form a mixture solution. Next, 2,4-dimethyl-2-imidazoline (Compound (B)) was added into the mixture solution in batches, for thermal polymerization at 130° C. for 8 hours, so as to obtain a meta-stable state nitrogen-containing polymer of Example 1. The molar ratio of 3% oligomer of phenylmethane maleimide to 2,4-dimethyl-2-imidazoline was 2:1.

The meta-stable state nitrogen-containing polymer of Example 1 was a narrow polydispersity polymer having a GPC peak time of 20.5 min and a PDI of 1.2, as shown in FIG. 1. Furthermore, the meta-stable state nitrogen-containing polymer of Example 1 was re-induced to react at a temperature of 186° C., to convert the meta-stable state nitrogen-containing polymer into a macromolecular polymer completely. Polydispersity index (PDI) is defined as weight average molecular weight divided by number average molecular weight (Mw/Mn).

Example 2

Firstly, 4,4'-diphenylmethane bismaleimide (Compound (A)) was dissolved in GBL in an amount of 5%, to form a mixture solution. Next, 2,4-dimethyl-2-imidazoline (Compound (B)) was added into the mixture solution in batches, for thermal polymerization at 100° C. for 15 hours, so as to obtain a meta-stable state nitrogen-containing polymer of Example 2. The molar ratio of 5% 4,4'-diphenylmethane bismaleimide to 2,4-dimethyl-2-imidazoline was 2:1.

Figure 2:
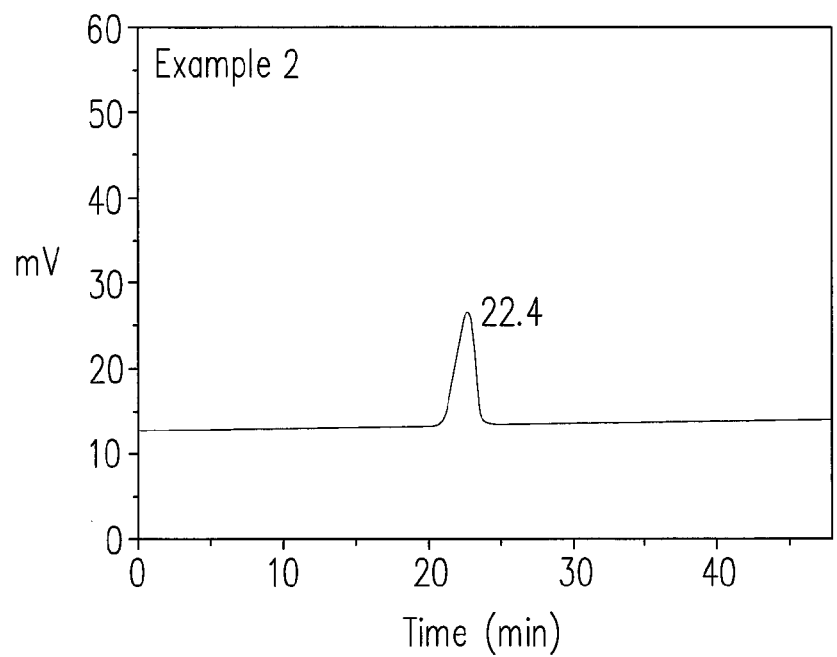

The meta-stable state nitrogen-containing polymer of Example 2 was a narrow polydispersity polymer having a GPC peak time of 22.4 min and a PDI of 1.2, as shown in FIG. 2. Furthermore, the meta-stable state nitrogen-containing polymer of Example 2 was re-induced to react at a temperature of 180° C., to convert the meta-stable state nitrogen-containing polymer into a macromolecular polymer completely.

Example 3

Firstly, oligomer of phenylmethane maleimide (Compound (A)) was dissolved in NMP in an amount of 3%, to form a mixture solution. Next, 2,4-dimethyl-2-imidazoline (Compound (B)) was added into the mixture solution in batches, for thermal polymerization at 150° C. for 3 hours, so as to obtain a meta-stable state nitrogen-containing polymer of Example 3. The molar ratio of 3% oligomer of phenylmethane maleimide to 2,4-dimethyl-2-imidazoline was 4:1.

Figure 3:
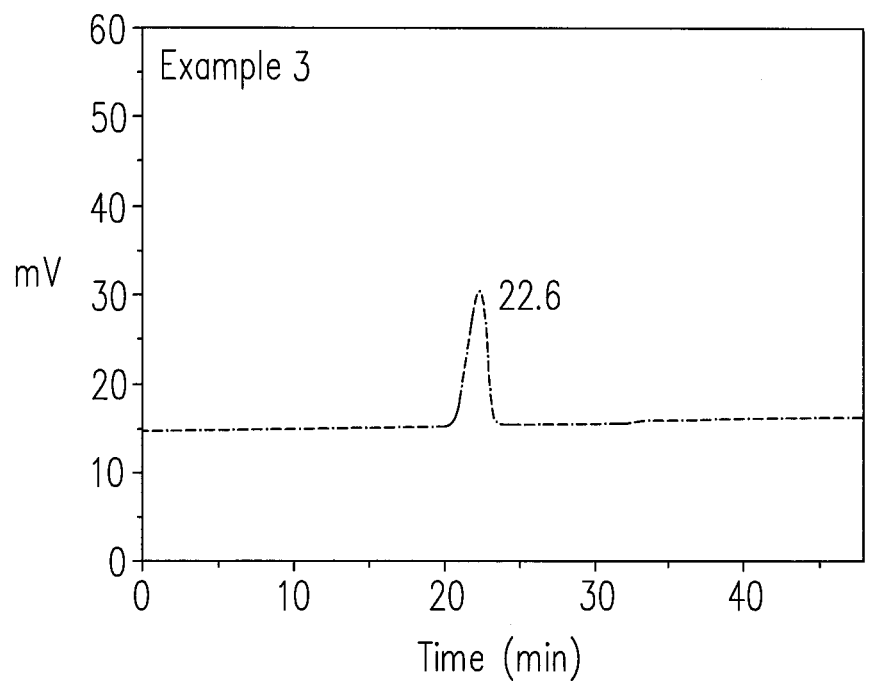

The meta-stable state nitrogen-containing polymer of Example 3 was a narrow polydispersity polymer having a GPC peak time of 22.6 min and a PDI of 1.2, as shown in FIG. 3. Furthermore, the meta-stable state nitrogen-containing polymer of Example 3 was re-induced to react at a temperature of 186° C., to convert the meta-stable state nitrogen-containing polymer into a macromolecular polymer completely.

Example 4

Firstly, 4,4'-diphenylmethane bismaleimide (Compound (A)) was dissolved in NMP in an amount of 3%, to form a mixture solution. Next, imidazole (Compound (B)) was added into the mixture solution in batches, for thermal polymerization at 130° C. for 8 hours, so as to obtain a meta-stable state nitrogen-containing polymer of Example 4. The molar ratio of 3% 4,4'-diphenylmethane bismaleimide to imidazole was 4:1.

Figure 4:
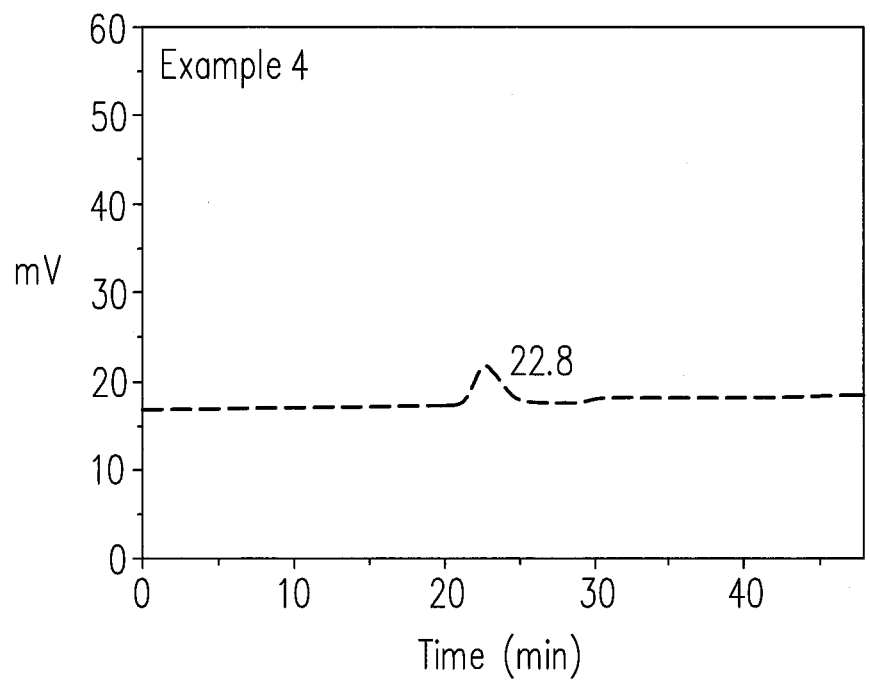

The meta-stable state nitrogen-containing polymer of Example 4 was a narrow polydispersity polymer having a GPC peak time of 22.8 min and a PDI of 1.3, as shown in FIG. 4. Furthermore, the meta-stable state nitrogen-containing polymer of Example 4 was re-induced to react at a temperature of 200° C., to convert the meta-stable state nitrogen-containing polymer into a macromolecular polymer completely.

Example 5

Firstly, 1,6'-bismaleimide-(2,2,4-trimethyl)hexane (Compound (A)) was dissolved in GBL in an amount of 3%, to form a mixture solution. Next, pyridazine (Compound (B)) was added into the mixture solution in batches, for thermal polymerization at 100° C. for 12 hours, so as to obtain a meta-stable state nitrogen-containing polymer of Example 5. The molar ratio of 3% 1,6'-bismaleimide-(2,2,4-trimethyl)hexane to pyridazine was 2:1.

Figure 5:
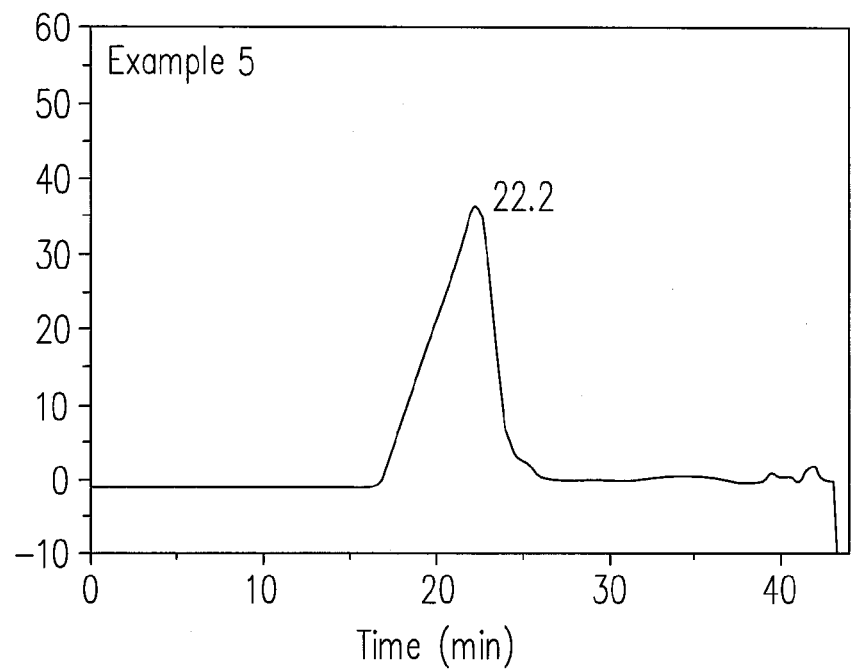

The meta-stable state nitrogen-containing polymer of Example 5 was a narrow polydispersity polymer having a GPC peak time of 22.2 min and a PDI of 1.5, as shown in FIG. 5. Furthermore, the meta-stable state nitrogen-containing polymer of Example 5 was re-induced to react at a temperature of 190° C., to convert t the meta-stable state nitrogen-containing polymer into a macromolecular polymer completely.

Example 6

Firstly, 2,2'-bis[4-(4-maleimidophenoxy)phenyl]propane (Compound (A)) was dissolved in GBL in an amount of 3%, to form a mixture solution. Next, pyridine (Compound (B)) was added into the mixture solution in batches, for thermal polymerization at 60° C. for 24 hours, so as to obtain a meta-stable state nitrogen-containing polymer of Example 6. The molar ratio of 3% 2,2'-bis[4-(4-maleimidophenoxy)phenyl]propane to pyridine was 4:1.

Figure 6:
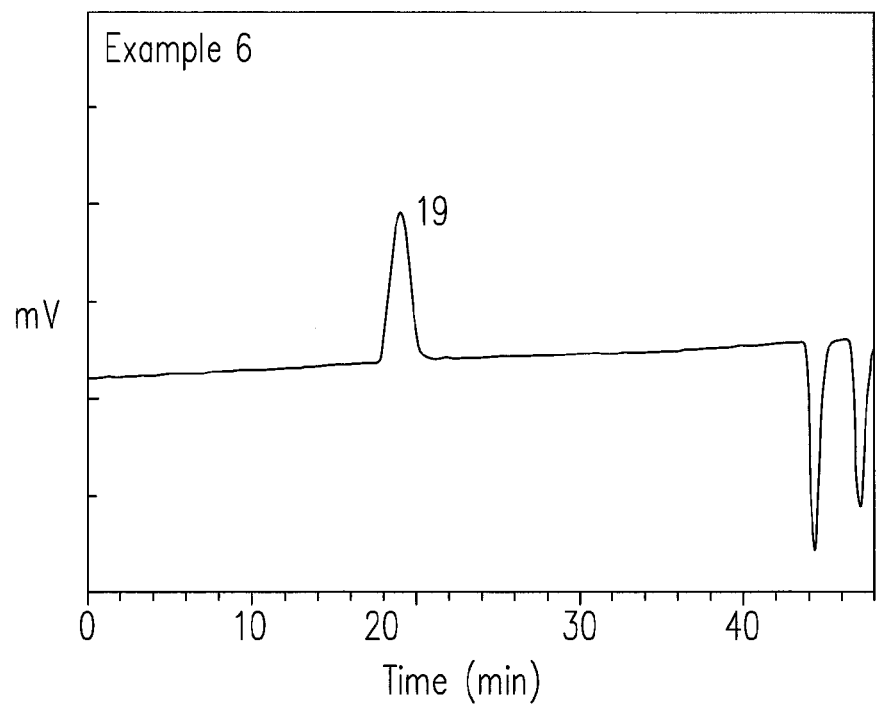

The meta-stable state nitrogen-containing polymer of Example 6 was a narrow polydispersity polymer having a GPC peak time of 19 min and a PDI of 1.2, as shown in FIG. 6. Furthermore, the meta-stable state nitrogen-containing polymer of Example 6 was re-induced to react at a temperature of 180° C., to convert the meta-stable state nitrogen-containing polymer into a macromolecular polymer completely.

Example 7

Firstly, oligomer of phenylmethane maleimide (Compound (A)) was dissolved in EC/PC in an amount of 5%, to form a mixture solution. Next, 2,4,6-triamino-1,3,5,-triazine (Compound (B)) was added into the mixture solution in batches, for thermal polymerization at 130° C. for 12 hours, so as to obtain a meta-stable state nitrogen-containing polymer of Example 7. The molar ratio of 5% oligomer of phenylmethane maleimide to 2,4,6-triamino-1,3,5,-triazine was 2:1.

Figure 7:
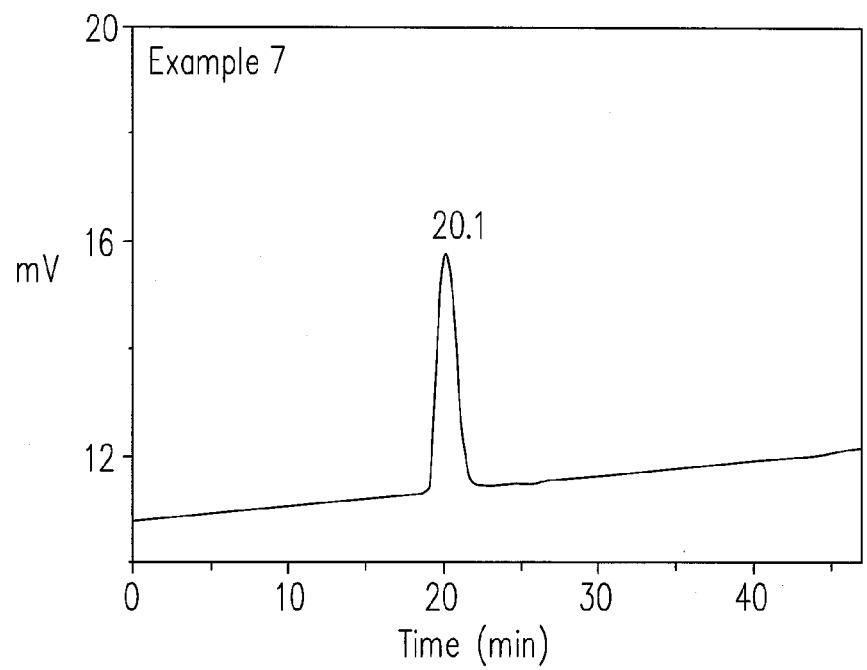

The meta-stable state nitrogen-containing polymer of Example 7 was a narrow polydispersity polymer having a GPC peak time of 20.1 min and a PDI of 1.1, as shown in FIG. 7. Furthermore, the meta-stable state nitrogen-containing polymer of Example 7 was re-induced to react at a temperature of 190° C., to convert the meta-stable state nitrogen-containing polymer into a macromolecular polymer completely.

Example 8

Firstly, oligomer of phenylmethane maleimide (Compound (A)) was dissolved in EC/PC in an amount of 5%, to form a mixture solution. Next, 2,4-dimethyl-2-imidazoline (Compound (B)) was added into the mixture solution in batches, for thermal polymerization at 80° C. for 18 hours, so as to obtain a meta-stable state nitrogen-containing polymer of Example 8. The molar ratio of 5% oligomer of phenylmethane maleimide to 2,4-dimethyl-2-imidazoline was 10:1.

Figure 8:
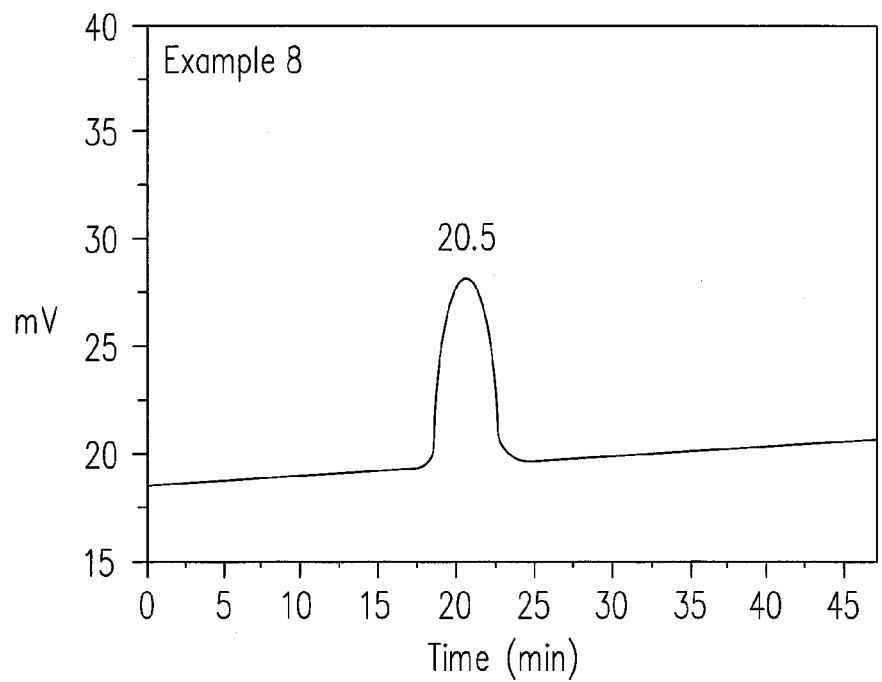

The meta-stable state nitrogen-containing polymer of Example 8 was a narrow polydispersity polymer having a GPC peak time of 20.5 min and a PDI of 1.5, as shown in FIG. 8. Furthermore, the meta-stable state nitrogen-containing polymer of Example 8 was re-induced to react at a temperature of 170° C., to convert the meta-stable state nitrogen-containing polymer into a macromolecular polymer completely.

Example 9

Firstly, 2,2'-bis[4-(4-maleimidophenoxy)phenyl]propane (Compound (A)) was dissolved in GBL in an amount of 5%, to form a mixture solution. Next, 4-tert-butylpyridine (Compound (B)) was added into the mixture solution in batches, for thermal polymerization at 60° C. for 24 hours, so as to obtain a meta-stable state nitrogen-containing polymer of Example 9. The molar ratio of 5% 2,2'-bis[4-(4-maleimidophenoxy)phenyl]propane to 4-tert-butylpyridine was 4:1.

Figure 9:
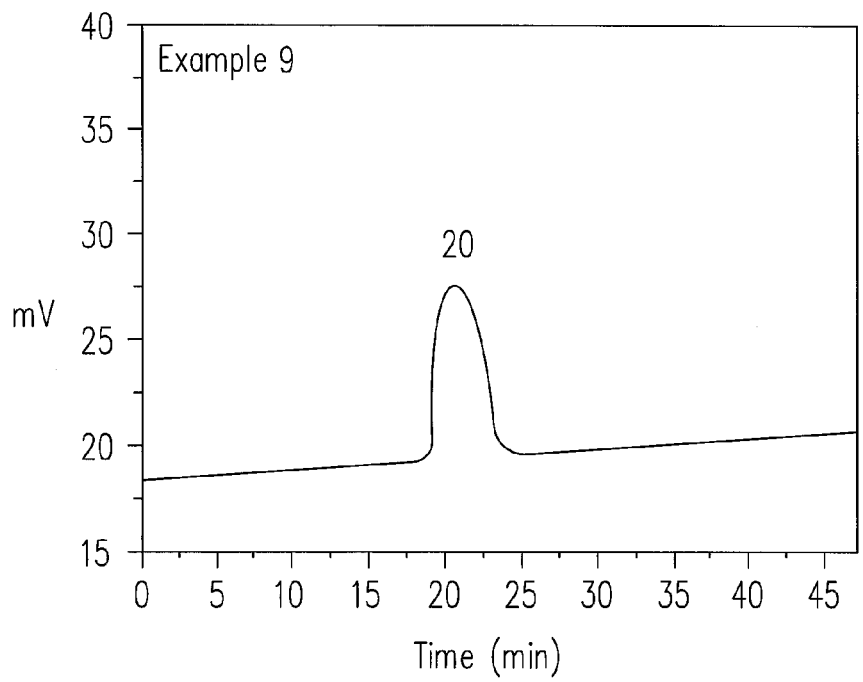

The meta-stable state nitrogen-containing polymer of Example 9 was a narrow polydispersity polymer having a GPC peak time of 20 min and a PDI of 1.5, as shown in FIG. 9. Furthermore, the meta-stable state nitrogen-containing polymer of Example 9 was re-induced to react at a temperature of 120° C., to convert the meta-stable state nitrogen-containing polymer into a macromolecular polymer completely.

Example 10

Firstly, 4,4'-diphenylmethane bismaleimide and 2,2-bis(4-(p-maleimidophenoxy)-phenyl)-hexafluoropropane in a molar ratio of 4:1 were dissolved in EC/PC, to form a 3% mixture solution. Next, 2,4-dimethyl-2-imidazoline was added into the mixture solution in batches, for thermal polymerization at 130° C. for 8 hours, so as to obtain a meta-stable state nitrogen-containing polymer of Example 10. The molar ratio of 3% mixture solution to 2,4-dimethyl-2-imidazoline was 2:1.

Figure 10:
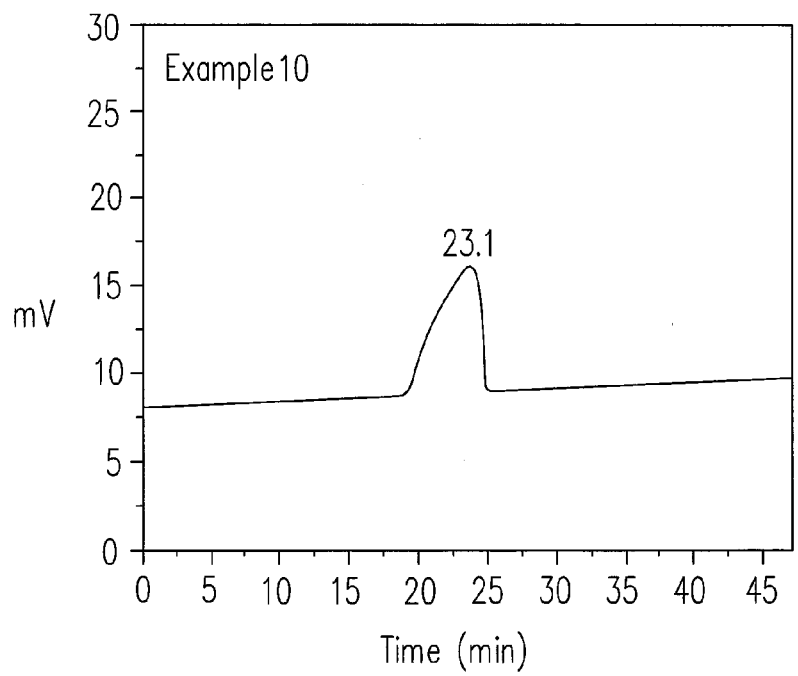

The meta-stable state nitrogen-containing polymer of Example 10 was a narrow polydispersity polymer having a GPC peak time of 23.1 min and a PDI of 1.5, as shown in FIG. 10. Furthermore, the meta-stable state nitrogen-containing polymer of Example 10 was re-induced to react at a temperature of 200° C., to convert the meta-stable state nitrogen-containing polymer into a macromolecular polymer completely.

Example 11

Firstly, 4,4'-diphenylmethane bismaleimide and 2,2-bis(4-(p-maleimidophenoxy)-phenyl)-hexafluoropropane in a molar ratio of 2:1 were dissolved in EC/PC, to form a 3% mixture solution. Next, 2,4-dimethyl-2-imidazoline was added into the mixture solution in batches, for thermal polymerization at 130° C. for 8 hours, so as to obtain a meta-stable state nitrogen-containing polymer of Example 11. The molar ratio of 3% mixture solution to 2,4-dimethyl-2-imidazoline was 2:1.

Figure 11:
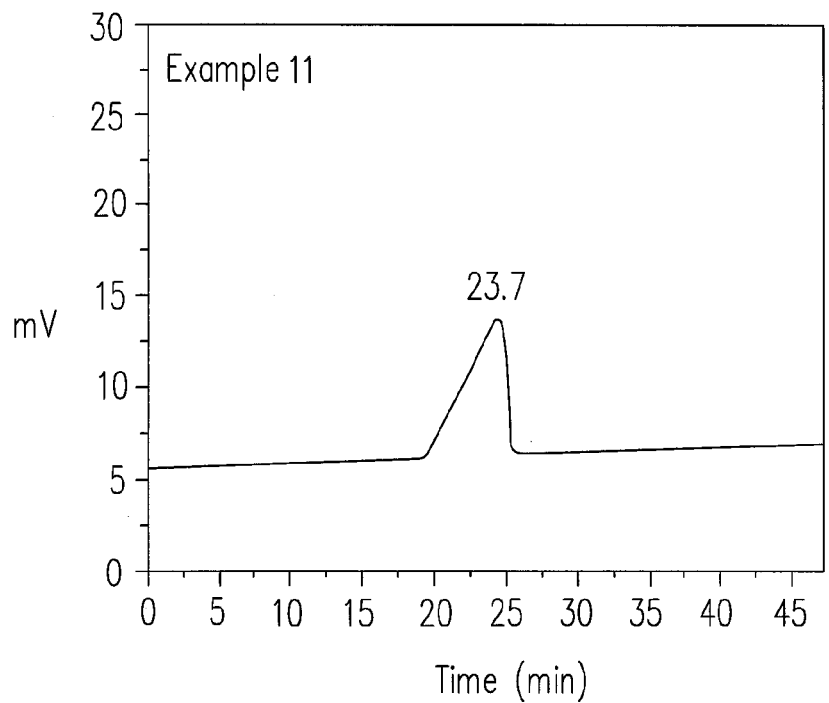

The meta-stable state nitrogen-containing polymer of Example 11 was a narrow polydispersity polymer having a GPC peak time of 23.7 min and a PDI of 1.5, as shown in FIG. 11. Furthermore, the meta-stable state nitrogen-containing polymer of Example 11 was re-induced to react at a temperature of 205° C., to convert the meta-stable state nitrogen-containing polymer into a macromolecular polymer completely.

Example 12

Firstly, 4,4'-diphenylmethane bismaleimide and 1,8-bis-maleimidodiethylene glycol in a molar ratio of 2:1 were dissolved in EC/PC, to form a 3% mixture solution. Next, 2,4-dimethyl-2-imidazoline was added into the mixture solution in batches, for thermal polymerization at 130° C. for 8 hours, so as to obtain a meta-stable state nitrogen-containing polymer of Example 12. The molar ratio of 3% mixture solution to 2,4-dimethyl-2-imidazoline was 2:1.

Figure 12:
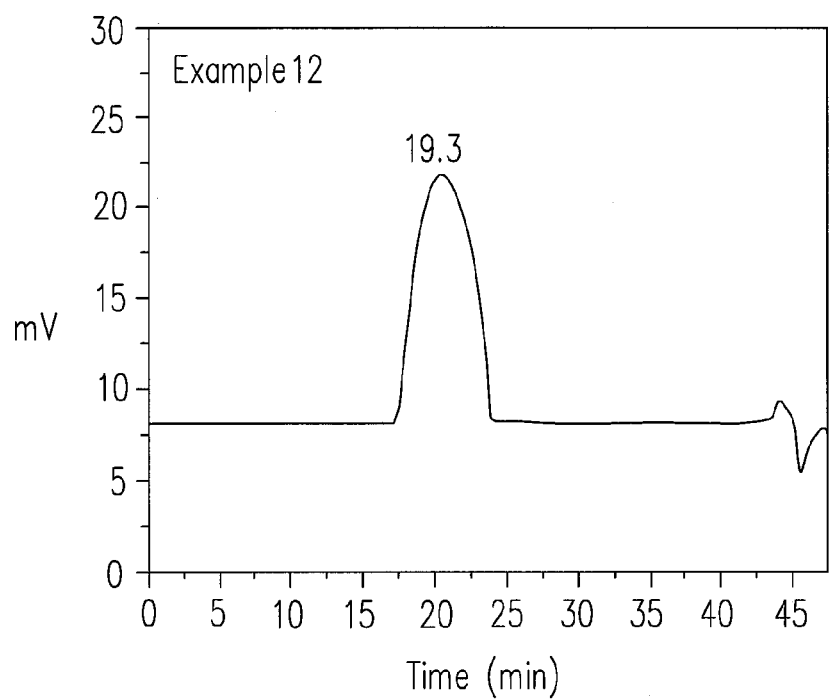

The meta-stable state nitrogen-containing polymer of Example 12 was a narrow polydispersity polymer having a GPC peak time of 19.3 min and a PDI of 1.5, as shown in FIG. 12. Furthermore, the meta-stable state nitrogen-containing polymer of Example 12 was re-induced to react at a temperature of 180° C., to convert the meta-stable state nitrogen-containing polymer into a macromolecular polymer completely.

Example 13

Firstly, tris(2-maleimidoethyl)amine and 2,2-bis(4-(p-maleimidophenoxy)-phenyl)-hexafluoropropane in a molar ratio of 2:1 were dissolved in EC/PC, to form a 3% mixture solution. Next, 2,4-dimethyl-2-imidazoline was added into the mixture solution in batches, for thermal polymerization at 130° C. for 4 hours, so as to obtain a meta-stable state nitrogen-containing polymer of Example 13. The molar ratio of 3% mixture solution to 2,4-dimethyl-2-imidazoline was 2:1.

Figure 13:
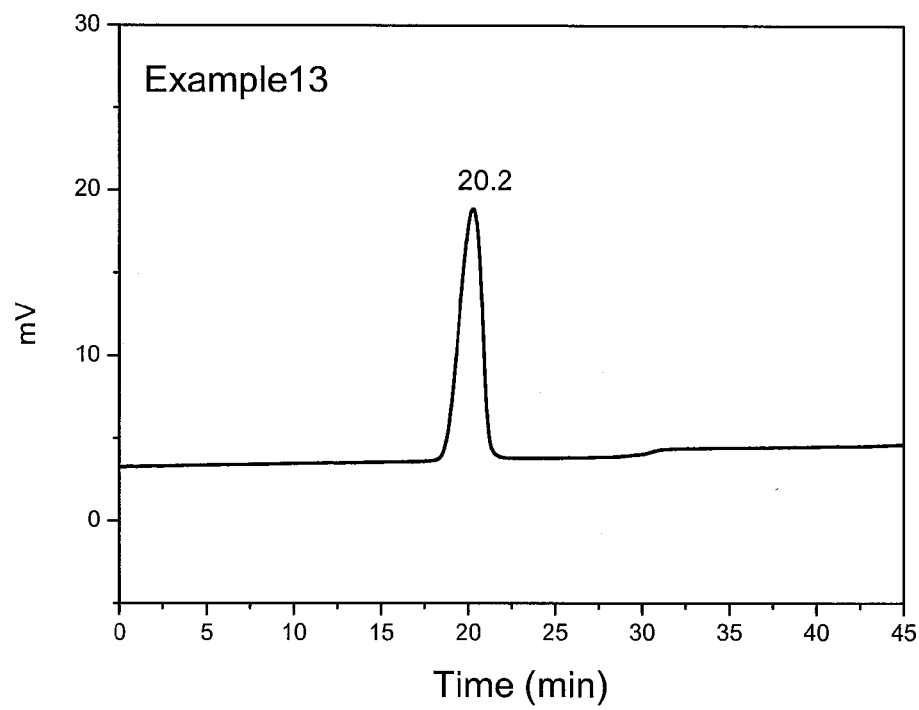

The meta-stable state nitrogen-containing polymer of Example 13 was a narrow polydispersity polymer having a GPC peak time of 20.2 min and a PDI of 1.1, as shown in FIG. 13. Furthermore, the meta-stable state nitrogen-containing polymer of Example 13 was re-induced to react at a temperature of 160° C., to convert the meta-stable state nitrogen-containing polymer into a macromolecular polymer completely.

Example 14

Firstly, 1,8-bis-maleimidodiethylene glycol and 2,2-bis(p-maleimidophenyl)-hexafluoropropane in a molar ratio of 4:1 were dissolved in EC/PC, to form a 3% mixture solution. Next, 2,4-dimethyl-2-imidazoline was added into the mixture solution in batches, for thermal polymerization at 120° C. for 6 hours, so as to obtain a meta-stable state nitrogen-containing polymer of Example 14. The molar ratio of 3% mixture solution to 2,4-dimethyl-2-imidazoline was 2:1.

Figure 14:
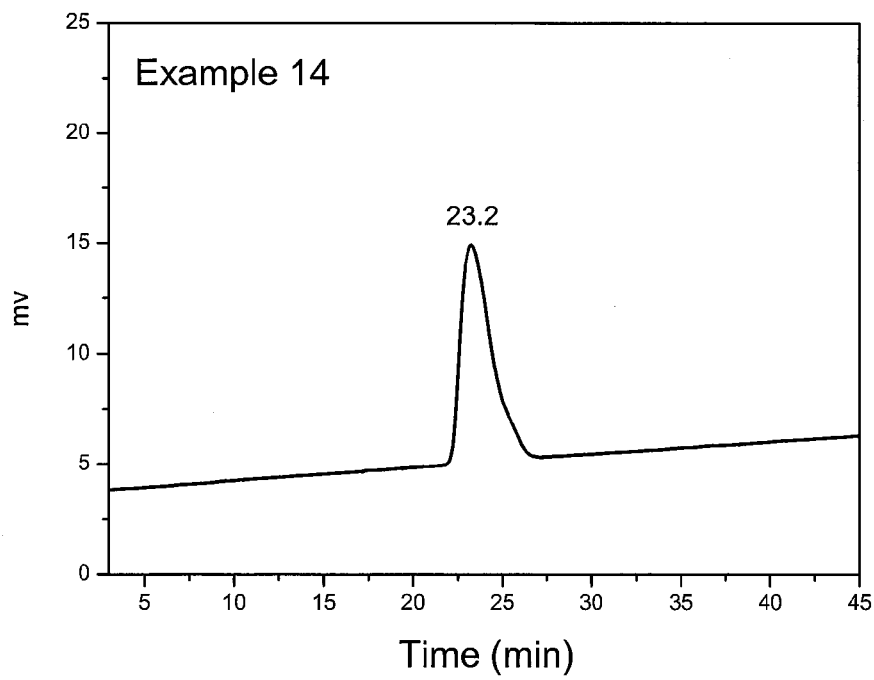

The meta-stable state nitrogen-containing polymer of Example 14 was a narrow polydispersity polymer having a GPC peak time of 23.2 min and a PDI of 1.2, as shown in FIG. 14. Furthermore, the meta-stable state nitrogen-containing polymer of Example 14 was re-induced to react at a temperature of 220° C., to convert the meta-stable state nitrogen-containing polymer into a macromolecular polymer completely.

Example 15

Firstly, 4,4'-diphenylether bismaleimide and 2,2-bis(4-(p-maleimidophenoxy)-phenyl)-hexafluoropropane in a molar ratio of 4:1 were dissolved in EC/PC, to form a 3% mixture solution. Next, 2,4-dimethyl-2-imidazoline was added into the mixture solution in batches, for thermal polymerization at 100° C. for 15 hours, so as to obtain a meta-stable state nitrogen-containing polymer of Example 15. The molar ratio of 3% mixture solution to 2,4-dimethyl-2-imidazoline was 2:1.

Figure 15:
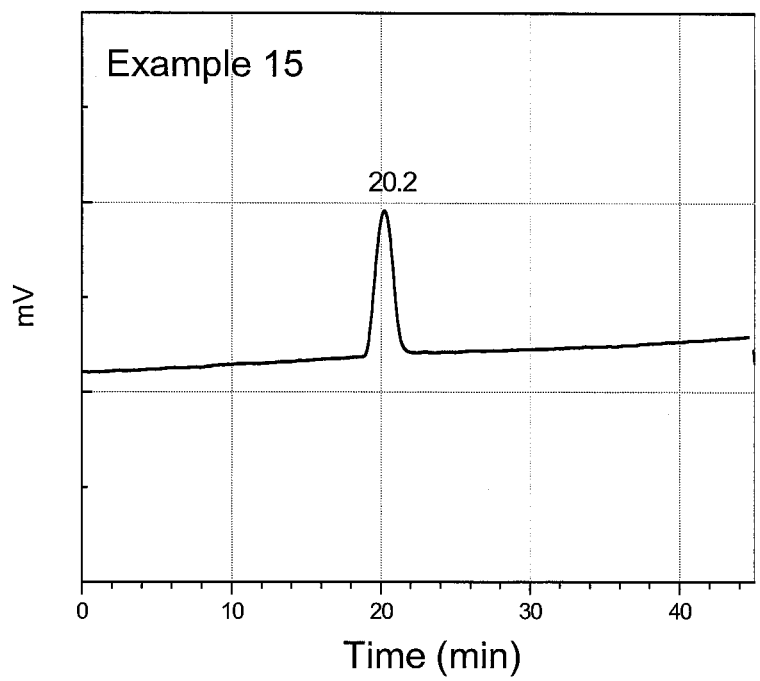

The meta-stable state nitrogen-containing polymer of Example 15 was a narrow polydispersity polymer having a GPC peak time of 20.2 min and a PDI of 1.1, as shown in FIG. 15. Furthermore, the meta-stable state nitrogen-containing polymer of Example 15 was re-induced to react at a temperature of 185° C., to convert the meta-stable state nitrogen-containing polymer into a macromolecular polymer completely.

Example 16

Firstly, 4,4'-diphenylsulfone bismaleimide and 2,2-bis(4-(p-maleimidophenoxy)-phenyl)-hexafluoropropane in a molar ratio of 4:1 were dissolved in EC/PC, to form a 3% mixture solution. Next, 2,4-dimethyl-2-imidazoline was added into the mixture solution in batches, for thermal polymerization at 130° C. for 8 hours, so as to obtain a meta-stable state nitrogen-containing polymer of Example 16. The molar ratio of 3% mixture solution to 2,4-dimethyl-2-imidazoline was 2:1.

Figure 16:
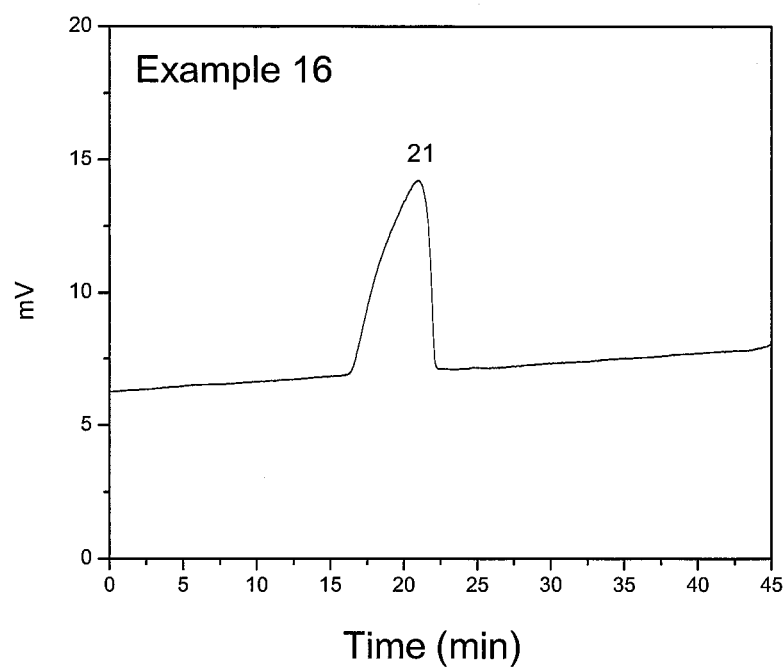

The meta-stable state nitrogen-containing polymer of Example 16 was a narrow polydispersity polymer having a GPC peak time of 21 min and a PDI of 1.6, as shown in FIG. 16. Furthermore, the meta-stable state nitrogen-containing polymer of Example 16 was re-induced to react at a temperature of 180° C., to convert the meta-stable state nitrogen-containing polymer into a macromolecular polymer completely.

Example 17

Firstly, 1,3-bis(3-maleimidophenoxy)benzene and 2,2-bis(4-(p-maleimidophenoxy)-phenyl)-hexafluoropropane in a molar ratio of 4:1 were dissolved in EC/PC, to form a 3% mixture solution. Next, 2,4-dimethyl-2-imidazoline was added into the mixture solution in batches, for thermal polymerization at 130° C. for 8 hours, so as to obtain a meta-stable state nitrogen-containing polymer of Example 17. The molar ratio of 3% mixture solution to 2,4-dimethyl-2-imidazoline was 2:1.

Figure 17:
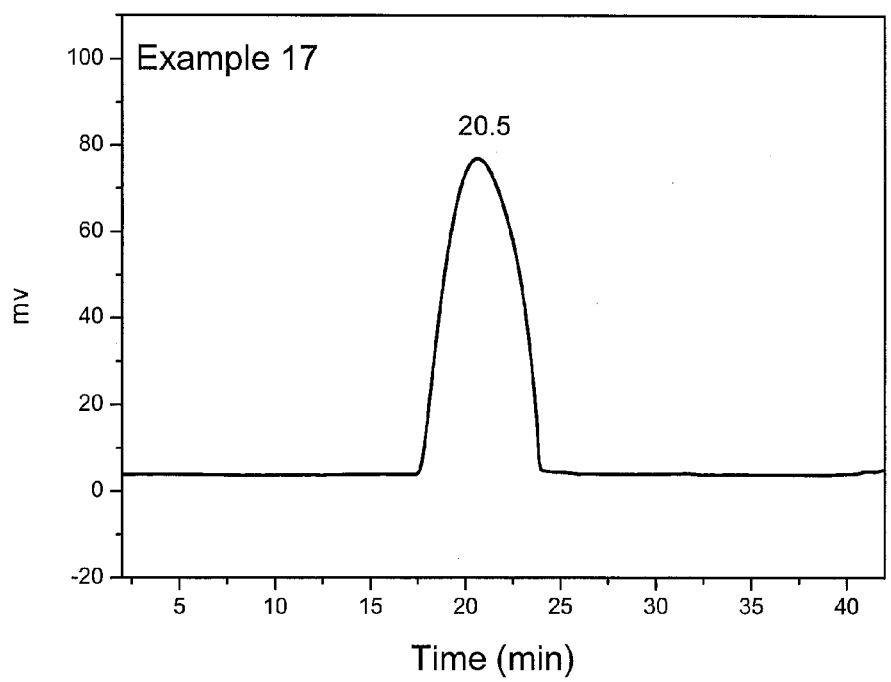

The meta-stable state nitrogen-containing polymer of Example 17 was a narrow polydispersity polymer having a GPC peak time of 20.5 min and a PDI of 1.6, as shown in FIG. 17. Furthermore, the meta-stable state nitrogen-containing polymer of Example 17 was re-induced to react at a temperature of 205° C., to convert the meta-stable state nitrogen-containing polymer into a macromolecular polymer completely.

Example 18

Firstly, tris(2-maleimidoethyl)amine was dissolved in EC/PC in an amount of 3%, to form a mixture solution. Next, 2,4-dimethyl-2-imidazoline was added into the mixture solution in batches, for thermal polymerization at 130° C. for 8 hours, so as to obtain a meta-stable state nitrogen-containing polymer of Example 18. The molar ratio of 3% tris(2-maleimidoethyl)amine to 2,4-dimethyl-2-imidazoline 2:1.

Figure 18:
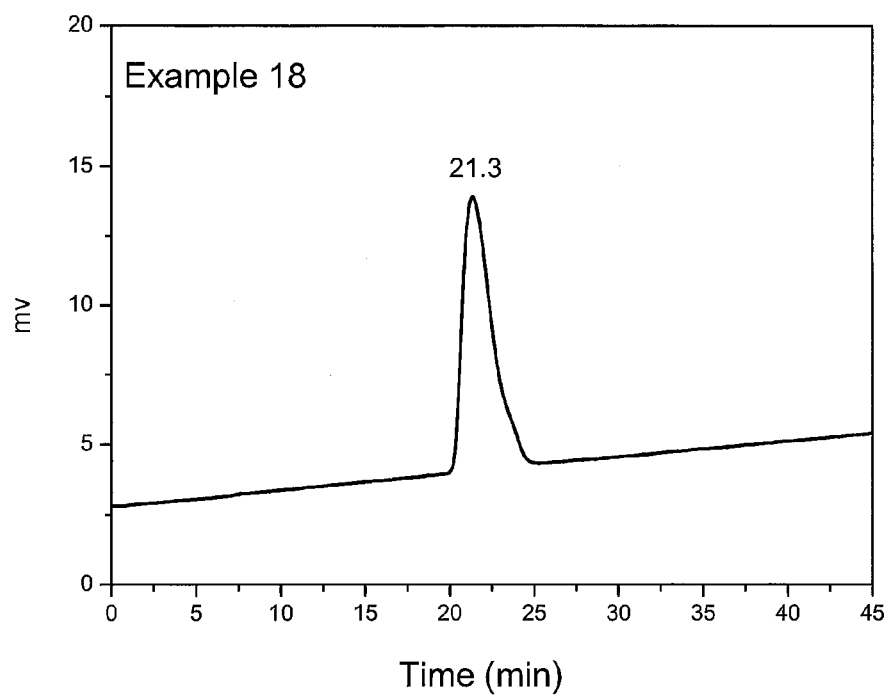

The meta-stable state nitrogen-containing polymer of Example 18 was a narrow polydispersity polymer having a GPC peak time of 21.3 min and a PDI of 1.2, as shown in FIG. 18. Furthermore, the meta-stable state nitrogen-containing polymer of Example 9 was re-induced to react at a temperature of 195° C., to convert the meta-stable state nitrogen-containing polymer into a macromolecular polymer completely.

Example 19

Firstly, 1,8-bis-maleimidodiethylene glycol and 4-maleimido-benzenesufonic acid in a molar ratio of 4:1 were dissolved in EC/PC, to form a 3% mixture solution. Next, 2,4-dimethyl-2-imidazoline was added into the mixture solution in batches, for thermal polymerization at 130° C. for 8 hours, so as to obtain a meta-stable state nitrogen-containing polymer of Example 19. The molar ratio of 3% mixture solution to 2,4-dimethyl-2-imidazoline was 2:1.

Figure 19:
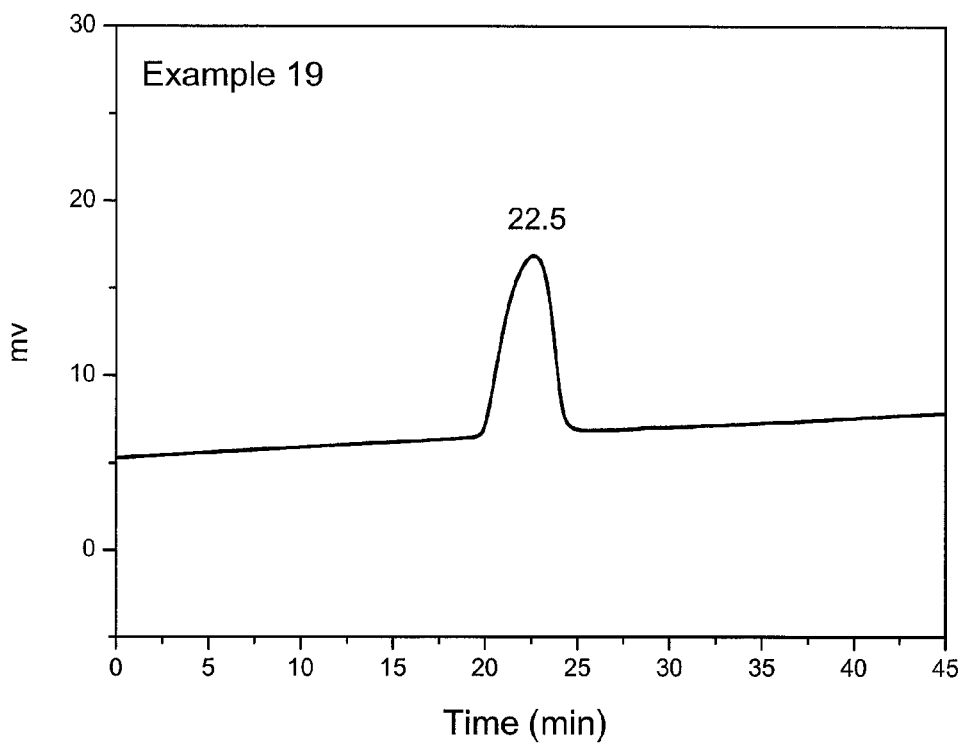

The meta-stable state nitrogen-containing polymer of Example 19 was a narrow polydispersity polymer having a GPC peak time of 22.5 min and a PDI of 1.3, as shown in FIG. 19. Furthermore, the meta-stable state nitrogen-containing polymer of Example 19 was re-induced to react at a temperature of 198° C., to convert the meta-stable state nitrogen-containing polymer into a macromolecular polymer completely.

Example 20

Firstly, 1,8-bis-maleimidodiethylene glycol and 2,2-bis(4-(p-maleimidophenoxy)-phenyl)-hexafluoropropane in a molar ratio of 4:1 were dissolved in GBL, to form a 3% mixture solution. Next, 2,4-dimethyl-2-imidazoline was added into the mixture solution in batches, for thermal polymerization at 120° C. for 8 hours, so as to obtain a meta-stable state nitrogen-containing polymer of Example 20. The molar ratio of 3% mixture solution to 2,4-dimethyl-2-imidazoline was 2:1.

Figure 20:
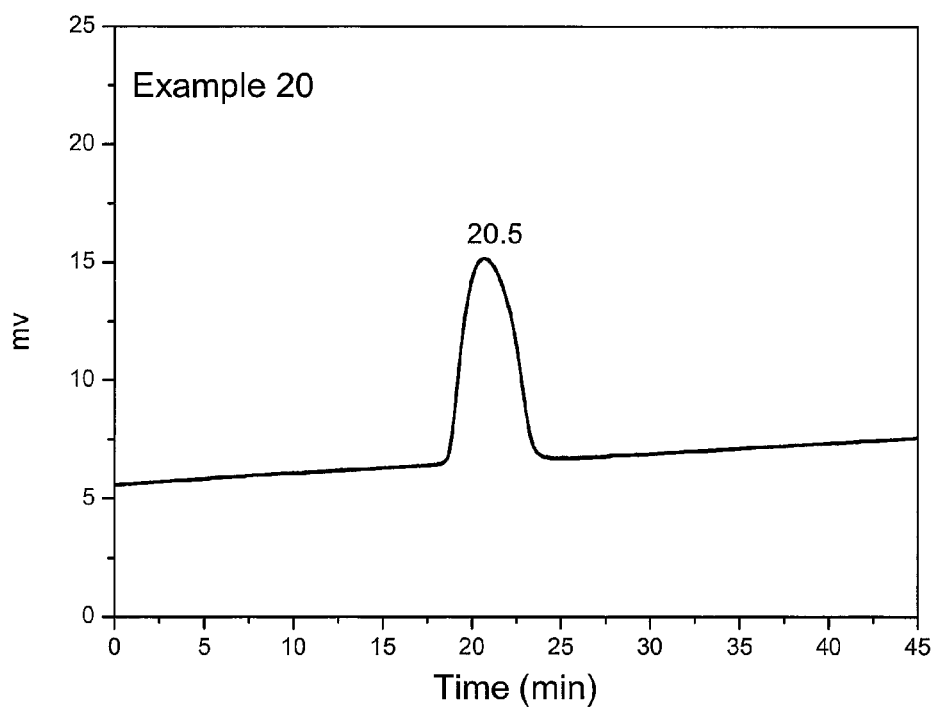

The meta-stable state nitrogen-containing polymer of Example 20 was a narrow polydispersity polymer having a GPC peak time of 20.5 min and a PDI of 1.3, as shown in FIG. 20. Furthermore, the meta-stable state nitrogen-containing polymer of Example 20 was re-induced to react at a temperature of 202° C., to convert the meta-stable state nitrogen-containing polymer into a macromolecular polymer completely.

Example 21

Firstly, tris(2-maleimidoethyl)amine and 4-maleimidophenol in a molar ratio of 2:1 were dissolved in GBL, to form a 3% mixture solution. Next, 4-tert-butylpyridine was added into the mixture solution in batches, for thermal polymerization at 110° C. for 6 hours, so as to obtain a meta-stable state nitrogen-containing polymer of Example 21. The molar ratio of 3% mixture solution to 4-tert-butylpyridine was 2:1.

Figure 21:
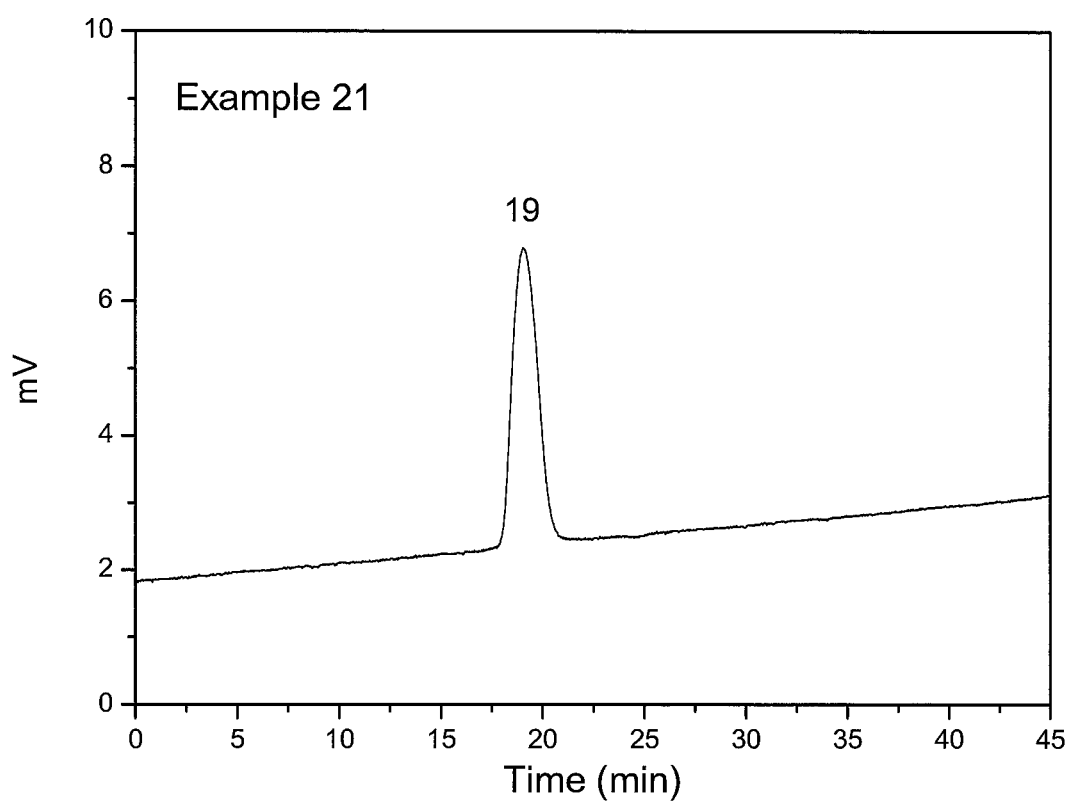

The meta-stable state nitrogen-containing polymer of Example 21 was a narrow polydispersity polymer having a GPC peak time of 19 min and a PDI of 1.1, as shown in FIG. 21. Furthermore, the meta-stable state nitrogen-containing polymer of Example 21 was re-induced to react at a temperature of 175° C., to convert the meta-stable state nitrogen-containing polymer into a macromolecular polymer completely.

Table 3 summaries synthesis conditions and experimental results of Examples 1-21.

TABLE 3

| Example | Compound (A)/Compound (B) (molar ratio) | Solvent | Reaction conditions | GPC peak time (min) | PDI | re-inducing temperature |
|---|---|---|---|---|---|---|
| 1 | 3% oligomer of phenylmethane maleimide/2,4-dimethyl-2-imidazoline (2:1) | EC/PC | 130° C., 8 h | 20.5 | 1.2 | 186° C. |
| 2 | 5% 4,4'-diphenylmethane bismaleimide/ 2,4-dimethyl-2-imidazoline (2:1) | GBL | 100° C., 15 h | 22.4 | 1.2 | 180° C. |
| 3 | 3% oligomer of phenylmethane maleimide/2,4-dimethyl-2-imidazoline (4:1) | NMP | 150° C., 3 h | 22.6 | 1.2 | 186° C. |
| 4 | 3% 4,4'-diphenylmethane bismaleimide/ imidazole (4:1) | NMP | 130° C., 8 h | 22.8 | 1.3 | 200° C. |
| 5 | 3% 1,6'-bismaleimide-(2,2,4-trimethyl)hexane/ pyridazine (2:1) | GBL | 100° C., 12 h | 22.2 | 1.5 | 190° C. |
| 6 | 3% 2,2'-bis[4-(4-maleimidophenoxy)phenyl] propane/ pyridine (4:1) | GBL | 60° C., 24 h | 19 | 1.2 | 180° C. |
| 7 | 5% oligomer of phenylmethane maleimide/2,4,6-triamino-1,3,5,-triazine (2:1) | EC/PC | 130° C., 12 h | 20.1 | 1.1 | 190° C. |
| 8 | 5% oligomer of phenylmethane maleimide/ 2,4-dimethyl-2-imidazoline (10:1) | EC/PC | 80° C., 18 h | 20.5 | 1.5 | 170° C. |
| 9 | 5% 2,2'-bis[4-(4-maleimidophenoxy)phenyl] propane/ 4-tert-butylpyridine (4:1) | GBL | 60° C., 24 h | 20 | 1.5 | 120° C. |
| 10 | 3% [4,4'-diphenylmethane bismaleimide: 2,2-bis(4-(p-maleimidophenoxy)-phenyl)- hexafluoropropane (4:1)]/ 2,4-dimethyl-2-imidazoline (2:1) | EC/PC | 130° C. 8 h | 23.1 | 1.5 | 200° C. |
| 11 | 3% [4,4'-diphenylmethane bismaleimide: 2,2-bis(4-(p-maleimidophenoxy)-phenyl)- hexafluoropropane (2:1)]/ 2,4-dimethyl-2-imidazoline (2:1) | EC/PC | 130° C., 8 h | 23.7 | 1.5 | 205° C. |
| 12 | 3% [4,4'-diphenylmethane bismaleimide: 1,8-bis-maleimidodiethylene glycol (2:1)]/2,4-dimethyl-2-imidazoline (2:1) | EC/PC | 130° C., 8 h | 19.3 | 1.5 | 180° C. |
| 13 | 3% [tris(2-maleimidoethyl)amine: 2,2-bis(4-(p-maleimidophenoxy)-phenyl)- hexafluoropropane (2:1)]/ 2,4-dimethyl-2-imidazoline (2:1) | EC/PC | 130° C. 4 h | 20.2 | 1.1 | 160° C. |
| 14 | 3% [1,8-bis-maleimidodiethylene glycol: 2,2-bis(p-maleimidophenyl)-hexafluoropropane (4:1)]/2,4-dimethyl-2-imidazoline (2:1) | EC/PC | 120° C., 6 h | 23.2 | 1.2 | 220° C. |
| 15 | 3% [4,4'-diphenylether bismaleimide: 2,2-bis(4-(p-maleimidophenoxy)-phenyl)- hexafluoropropane (4:1)]/ 2,4-dimethyl-2-imidazoline (2:1) | EC/PC | 100° C. 15 h | 20.2 | 1.1 | 185° C. |
| 16 | 3% [4,4'-diphenylsulfone bismaleimide: 2,2-bis(4-(p-maleimidophenoxy)-phenyl)- hexafluoropropane (4:1)]/ 2,4-dimethyl-2-imidazoline (2:1) | EC/PC | 130° C., 8 h | 21 | 1.6 | 180° C. |
| 17 | 3% [1,3-bis(3-maleimidophenoxy)benzene: 2,2-bis(4-(p-maleimidophenoxy)-phenyl)- hexafluoropropane (4:1)]/ 2,4-dimethyl-2-imidazoline (2:1) | EC/PC | 130° C., 8 h | 20.5 | 1.6 | 205° C. |
| 18 | 3% tris(2-maleimidoethyl)amine/ 2,4-dimethyl-2-imidazoline (2:1) | EC/PC | 130° C., 8 h | 21.3 | 1.2 | 195° C. |

TABLE 3-continued

| Example | Compound (A)/Compound (B) (molar ratio) | Solvent | Reaction conditions | GPC peak time (min) | PDI | re-inducing temperature |
|---|---|---|---|---|---|---|
| 19 | 3% [1,8-bis-maleimidodiethylene glycol: 4-maleimido-benzenesufonic acid (4:1)]/ 2,4-dimethyl-2-imidazoline (2:1) | EC/PC | 130° C. 8 h | 22.5 | 1.3 | 198° C. |
| 20 | 3% [1,8-bis-maleimidodiethylene glycol: 2,2-bis(4-(p-maleimidophenoxy)-phenyl)-hexafluoropropane (4:1)]/ 2,4-dimethyl-2-imidazoline (2:1) | GBL | 120° C. 8 h | 20.5 | 1.3 | 202° C. |
| 21 | 3% [tris(2-maleimdoethyl)amine: 4-maleimidophenol (2:1)]/ 4-tert-butylpyridine (2:1) | GBL | 110° C. 6 h | 19 | 1.1 | 175° C. |

Figure 22:
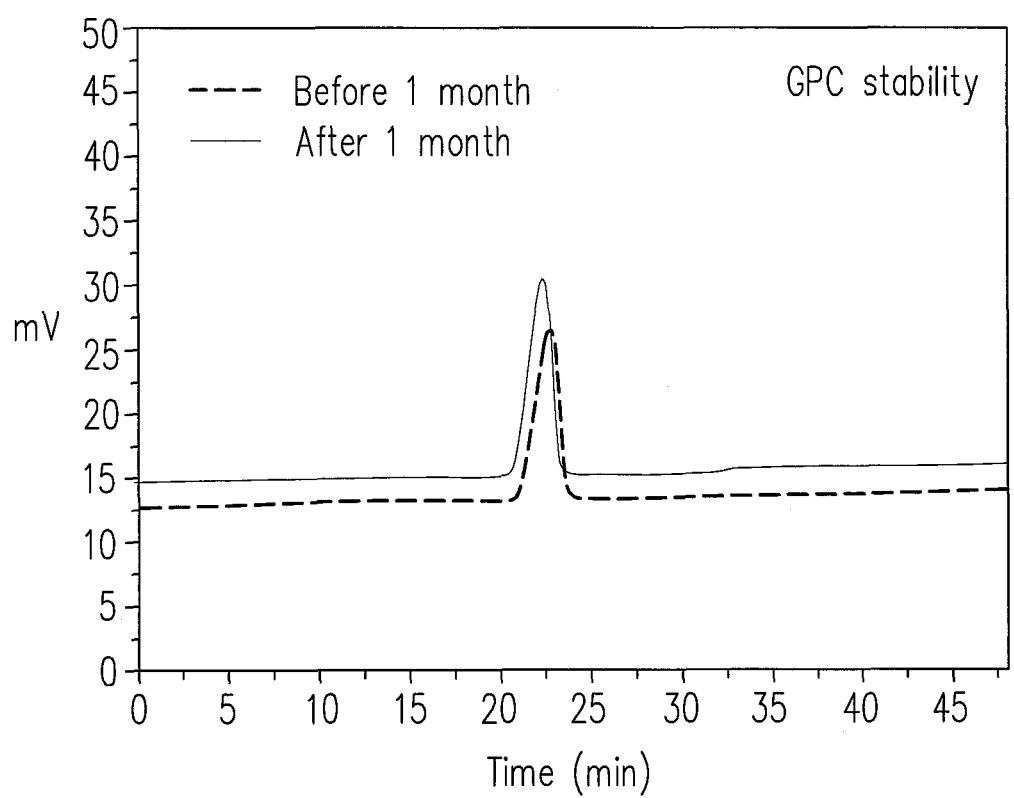
FIG. 22 is a diagram illustrating the variation of GPC of the meta-stable state nitrogen-containing polymer of Example 3 according to the disclosure over time.
Figure 23:
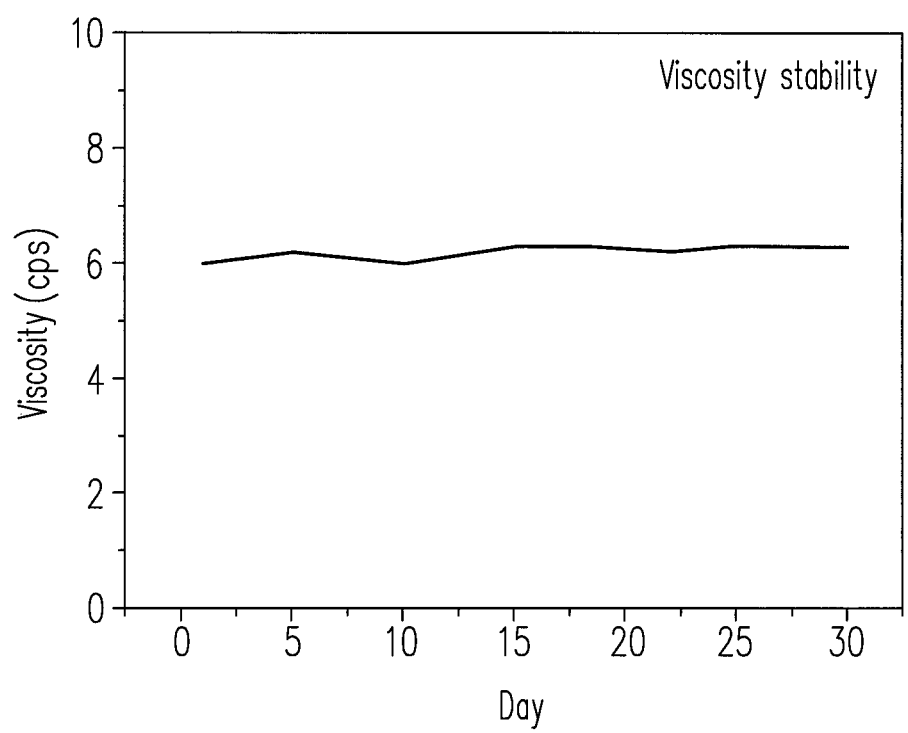
FIG. 23 is a diagram illustrating the variation of viscosity of the meta-stable state nitrogen-containing polymer of Example 3 according to the disclosure over time.

Furthermore, GPC stability test and viscosity stability test were also performed on the meta-stable state nitrogen-containing polymer of Example 3, as shown in FIGS. 22-23. Referring to FIG. 22, the meta-stable state nitrogen-containing polymer of Example 3 was stored at 55° C. for 1 month, wherein the PDI of the first day is 1.2, and the PDI of the $30^{th}$ day is 1.21, and the variance of PDI of the meta-stable state nitrogen-containing polymer of Example 3 is lower than 2% after being stored at 55° C. for 1 month. Referring to FIG. 23, the meta-stable state nitrogen-containing polymer of Example 3 was stored at 55° C. for 1 month, wherein the viscosity of the first day is 6.2 cP, and the viscosity of the $30^{th}$ day is 6.3 cP, and the variance of viscosity of the meta-stable state nitrogen-containing polymer of Example 3 is lower than 2% after being stored at 55° C. for 1 month.

In the above embodiments, Compound (B) is described with a heterocyclic amino aromatic derivative as a nucleophilic initiator as an example; however, the disclosure is not limited thereto. Persons of ordinary skill in the art should appreciate that, Compound (B) may also be a tertiary amine or a secondary amine, which is reacted with Compound (A) (that is, a monomer with a reactive terminal functional group), to generate a meta-stable state nitrogen-containing polymer.

In summary, the meta-stable state nitrogen-containing polymer of the disclosure has the advantages of both "two-liquid type" and "one-liquid type" polymers but without the drawbacks of the same. In details, the meta-stable state nitrogen-containing polymer of the disclosure does not require a mixing step and can be stored at room temperature (or above room temperature) for a long period of time, and the viscosity thereof will not change drastically after unsealing.

Furthermore, the meta-stable state nitrogen-containing polymer of the disclosure has part of the functional groups remained, which is beneficial to the subsequent processing, and optionally, the remaining reactive function groups may be facilitated to react by heating or applying a voltage. The application of the meta-stable state nitrogen-containing polymer of the disclosure is wide, such as an electrolyte additive of a secondary battery, a water-keeping layer of a fuel cell, a solid electrolyte, etc.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A meta-stable state nitrogen-containing polymer comprising a reaction product of reactants of a Compound (A) and a Compound (B), wherein the Compound (A) is a monomer with a reactive terminal functional group, the Compound (B) is a heterocyclic amino aromatic derivative as an initiator, and a molar ratio of the Compound (A) to the Compound (B) is from 10:1 to 1:10, wherein the Compound (B) is gradually added, in batches at multiple times, into a mixture solution of Compound (A)/solvent system at a reaction temperature for thermal polymerization.

2. The meta-stable state nitrogen-containing polymer according to claim 1, wherein the Compound (B) is represented by one of Formula (I) to Formula (9):

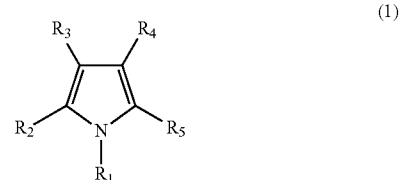

(1)

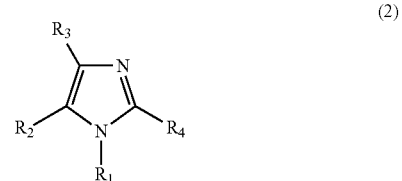

(2)

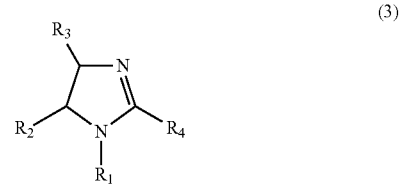

(3)

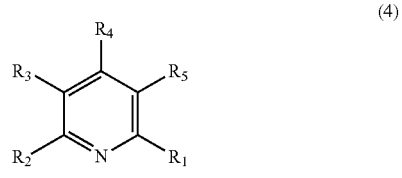

(4)

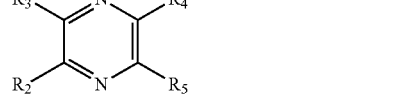

(5)

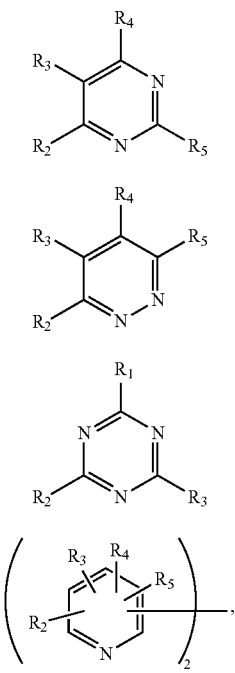

(6)

(7)

(8)

(9)

wherein R1 is hydrogen, alkyl, alkenyl, phenyl, dimethylamino, or —NH2; and R2, R3, R4, and R5 are each independently hydrogen, alkyl, alkenyl, halo, or —NH2.

3. The meta-stable state nitrogen-containing polymer according to claim 1, wherein the Compound (B) comprises imidazole, an imidazole derivative, pyrrole, an pyrrole derivative, pyridine, 4-tert-butylpyridine, 3-butylpyridine, 4-dimethylaminopyridine, 2,4,6-triamino-1,3,5,-triazine, 2,4-dimethyl-2-imidazoline, pyridazine, pyrimidine, pyrazine, or a combination thereof.

4. The meta-stable state nitrogen-containing polymer according to claim 1, wherein the Compound (A) comprises a maleimide, poly(ethylene glycol)dimethacrylate, bis[[4-[(vinyloxy)methyl]cyclohexyl]methyl]isophthalate), triallyl trimellitate, or a combination thereof, wherein the maleimide is represented by one of Formula (10) to Formula (13):

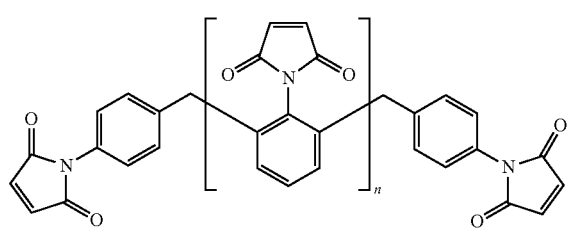

(10)

(11)

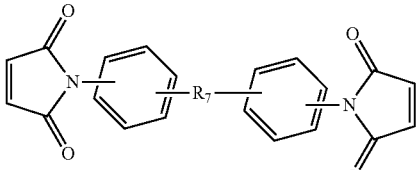

(12)

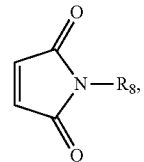

(13)

wherein n is an integer of 0 to 4; R6 is —RCH2R'—, —RNHR—, —C(O)CH$_2$—, —R'OR"OR'—, —CH2OCH2—, —C(O)—, —O—, —O—O—, —S—, —S—S—, —S(O)—, —CH$_2$S(O)CH2—, —(O)S(O)—, —C6H4—, —CH2(C6H4)CH2—, —CH2(C6H4)(O)—, —CH2—(NC2H4)-C$_2$H$_4$—, siloxane, biphenylenyl, substituted phenylene or substituted biphenylenyl, R is C1-4 alkylene, R' is C1-4 alkylene, biphenylenyl, substituted phenylene or substituted biphenylenyl, R" is C1-4 alkylene, substituted phenylene or —C6H4-C(CF3)2-C6H4-, biphenylenyl or substituted biphenylenyl; R7 is RiCH2-, —CH2-(O)—, —C(CH3)2-, —O—, —O—O—, —S—, —S—S—, —(O)S(O)—, —C(CF3)$_2$— or —S(O)—, R1 is C1-4 alkylene; and R8 is hydrogen, C1-4 alkyl, phenyl, benzyl, cyclohexyl, —SO3H, —C6H4CN, N-methoxy carbonyl, —(C6H4)-O(C2H4O)—CH3, C2H4-(C2H4O)11-CH3 or —C(O)CH3.

5. The meta-stable state nitrogen-containing polymer according to claim 1, wherein the Compound (A) comprises 4,4'-diphenylmethane bismaleimide, oligomer of phenylmethane maleimide, m-phenylene bismaleimide, 2,2'-bis[4-(4-maleimidophenoxy)phenyl]propane, 3,3'-dimethyl-5,5'-diethyl-4,4'-diphenylmethane bismaleimide, 4-methyl-1,3-phenylene bismaleimide, 1,6'-bismaleimide-(2,2,4-trimethyl)hexane, 4,4'-diphenylether bismaleimide, 4,4'-diphenylsulfone bismaleimide, 1,3-bis(3-maleimidophenoxy)-phenyl)-hexafluoropropane, 2,2-bis(p-maleimidophenyl)-hexafluoropropane, 1,8-bis-maleimidodiethylene glycol, tris(2-maleimidoethyl)amine, poly(ethylene glycol(11)) 4-maleimidophenyl methyl diether terminated, 4-maleimidophenol, 4-maleimido-benzenesulfonic acid, poly(ethylene glycol(11)) 2-maleimidoethyl methyl diether terminated, 2-maleimido propylene glycol 1-(2-methoxyethyl)ether, ethylene glycol 2-maleimidopropyl methyl diether, or poly(dimethsiloxane)bis(3-maleimidopropyl-dimethyl silyl) terminated.

6. The meta-stable state nitrogen-containing polymer according to claim 1, wherein the molar ratio of the Compound (A) to the Compound (B) is from 1:1 to 5:1.

7. The meta-stable state nitrogen-containing polymer according to claim 1, wherein the meta-stable state nitrogen-containing polymer is a narrow polydispersity polymer.

8. The meta-stable state nitrogen-containing polymer according to claim 7, wherein the meta-stable state nitrogen-containing polymer has a polydispersity index of 0.9-1.7.

9. The meta-stable state nitrogen-containing polymer according to claim 7, wherein the meta-stable state nitrogen-containing polymer has a GPC peak time of 19-24 minutes.

10. The meta-stable state nitrogen-containing polymer according to claim 1, wherein the meta-stable state nitrogen-containing polymer is re-induced to react at a temperature of 120-220° C., to convert the meta-stable state nitrogen-containing polymer into a macromolecular polymer completely.

* * * * *